United States Patent
Chen et al.

(10) Patent No.: US 11,527,212 B2
(45) Date of Patent: Dec. 13, 2022

(54) DYNAMIC IMAGE ENHANCEMENT METHOD AND DEVICE USING BACKLIGHT ADJUSTMENT, AND COMPUTER APPARATUS

(71) Applicant: SHENZHEN TCL NEW TECHNOLOGY CO., LTD., Shenzhen (CN)

(72) Inventors: Yixin Chen, Shenzhen (CN); Renli Xie, Shenzhen (CN)

(73) Assignee: Shenzhen TCL New Technology Co., Ltd., Shenzhen (CN)

( * ) Notice: Subject to any disclaimer, the term of this patent is extended or adjusted under 35 U.S.C. 154(b) by 56 days.

(21) Appl. No.: 17/257,537

(22) PCT Filed: Oct. 15, 2019

(86) PCT No.: PCT/CN2019/111217
§ 371 (c)(1),
(2) Date: Dec. 31, 2020

(87) PCT Pub. No.: WO2020/078347
PCT Pub. Date: Apr. 23, 2020

(65) Prior Publication Data
US 2021/0366413 A1      Nov. 25, 2021

(30) Foreign Application Priority Data
Oct. 16, 2018 (CN) .......................... 201811203310.8

(51) Int. Cl.
*G09G 3/34* (2006.01)
*G09G 5/10* (2006.01)

(52) U.S. Cl.
CPC ............ *G09G 3/3406* (2013.01); *G09G 5/10* (2013.01); *G09G 2320/0626* (2013.01); *G09G 2360/16* (2013.01)

(58) Field of Classification Search
CPC ................... G09G 3/3406; G09G 5/10; G09G 2320/0626; G09G 2360/16;
(Continued)

(56) References Cited

U.S. PATENT DOCUMENTS

2006/0083425 A1    4/2006   Moldvai
2010/0188531 A1    7/2010   Cordes et al.
(Continued)

FOREIGN PATENT DOCUMENTS

CN        1925558 A     3/2007
CN     101364384 A     2/2009
(Continued)

OTHER PUBLICATIONS

The World Intellectual Property Organization (WIPO) International Search Report for PCT/CN2019/111217 dated Jan. 20, 2020 6 Pages.

(Continued)

*Primary Examiner* — Rodney Amadiz
(74) *Attorney, Agent, or Firm* — Nathan & Associates; Menachem Nathan (57) ABSTRACT

A dynamic image enhancement method and device using backlight adjustment, and a computer apparatus. The method comprises: acquiring coding information carried by display content; acquiring an optical indicator parameter of a display; parsing the display content according to the coding information and the optical indicator parameter, and acquiring information of current display content; performing analysis and computation according to the information of the display content, and acquiring analysis data; acquiring a first detail statistics weight and a second detail statistics weight according to the analysis data; acquiring a backlight control parameter and a signal control curve according to the first detail statistics weight and the second detail statistics (Continued)

weight; and adjusting the detail of a current image according to the backlight control parameter and the signal control curve.

8 Claims, 4 Drawing Sheets

(58) Field of Classification Search
CPC .. G09G 2320/0646; G06T 2207/20008; G06T 5/007
See application file for complete search history.

(56) References Cited

U.S. PATENT DOCUMENTS

| | | |
|---|---|---|
| 2014/0210847 A1 | 7/2014 | Knibbeler et al. |
| 2015/0003749 A1 | 1/2015 | Kim et al. |
| 2019/0026872 A1* | 1/2019 | Lee .................. H04N 1/646 |

FOREIGN PATENT DOCUMENTS

| | | |
|---|---|---|
| CN | 102210145 A | 10/2011 |
| CN | 103313002 A | 9/2013 |
| CN | 105139809 A | 12/2015 |
| CN | 105303586 A | 2/2016 |
| CN | 105321487 A | 2/2016 |
| CN | 105654436 A | 6/2016 |
| CN | 107274364 A | 10/2017 |
| CN | 108257580 A | 7/2018 |
| EP | 2947881 A1 | 11/2015 |
| JP | 2007013666 A | 1/2007 |

OTHER PUBLICATIONS

Extended European Search Report dated Oct. 29, 2021 From European Patent Office Re. Application No. EP19872951.9.

* cited by examiner

DYNAMIC IMAGE ENHANCEMENT METHOD AND DEVICE USING BACKLIGHT ADJUSTMENT, AND COMPUTER APPARATUS

CROSS-REFERENCES TO RELATED APPLICATIONS

This application is a national stage application of PCT Patent Application No. PCT/CN2019/111217, filed on Oct. 15, 2019, which claims priority to Chinese Patent Application No. 201811203310.8, filed on Oct. 16, 2018, the content of all of which is incorporated herein by reference.

FIELD OF THE INVENTION

The present disclosure relates to the technical field of computer, and, more particularly, to a dynamic image enhancement method and device using a backlight adjustment, and a computer apparatus.

BACKGROUND

In the prior art, a backlight adjustment is a common display processing technology, but a traditional backlight adjustment scheme generally needs to sacrifice a plurality of image details. Due to an inappropriate sacrifice of a plurality of signal details, a picture may not be presented completely, thus impossible to truly convey a true intention of a director.

BRIEF SUMMARY OF THE DISCLOSURE

According to the above described defects, the purpose of the present disclosure is providing a dynamic image enhancement method and device using a backlight adjustment, and a computer apparatus, when adjusting a backlight, sacrificing no image details, instead, being able to enhance the image details to a certain extent, while having a better image layering, and a deeper third-dimensional sense, making a detail of an image displayed clearer.

A dynamic image enhancement method using a backlight adjustment, wherein the method comprises:
  acquiring an encoding information that comes with a display content;
  acquiring an optical indicator parameter of a monitor;
  parsing the display content according to the encoding information and the optical indicator parameter, and obtaining an information of a display content on present;
  obtaining an analysis data according to analyzing and calculating the information of the display content; wherein the analysis data comprises an average brightness of a frame of an image on present, a character point for a dark state detail, an actual maximum brightness of the frame of the image on present, a theoretical maximum brightness of the frame of the image on present and a best brightness of the frame of the image on present;
  obtaining a first detail statistics weight value and a second detail statistics weight value, according to the analysis data;
  calculating and obtaining a backlight control parameter and a signal control curve according to the first detail statistics weight value and the second detail statistics weight value;
  adjusting a detail of the frame of the image on present according to the backlight control parameter and the signal control curve.

In one embodiment, a step of acquiring the encoding information that comes with the display content comprises specifically: a system software of the monitor encodes and decodes the display content input to obtain the encoding information that comes with the display content.

In one embodiment, the encoding information comprises a maximum display brightness of a monitor, a minimum display brightness of the monitor, and a maximum signal amplitude of a content.

In one embodiment, the optical indicator parameter comprises a maximum display brightness of a full screen and a maximum display brightness of a plurality of small backlight windows.

In one embodiment, a step of parsing the display content according to the encoding information and the optical indicator parameter, and obtaining the information of the display content on present, comprises: inputting the encoding information into a first query module to obtain a maximum query brightness of the monitor; inputting the optical indicator parameter into a second query module to obtain a maximum display brightness parameter curve of the small backlight window; performing a photoelectric conversion according to the maximum query brightness of the monitor and the maximum display brightness of the small backlight window, and making a statistical analysis of the frame of the image on present to obtain a statistical list.

In one embodiment, the maximum query brightness of the monitor ranges from 0 to 1023.

In one embodiment, a step of obtaining the analysis data according to analyzing and calculating the information of the display content further comprises: performing a statistical analysis on the display content and obtaining a signal mapping function.

In one embodiment, a step of obtaining the first detail statistics weight value and the second detail statistics weight value, according to the analysis data comprises: inputting the analysis data comprising the average brightness of the frame of the image on present, the character point for the dark state detail, the actual maximum brightness of the frame of the image on present into a third query module, and obtaining the first detail statistics weight value; inputting the theoretical maximum brightness of the frame of the image on present and the best brightness of the frame of the image on present into a fourth query module, and obtaining the second detail statistics weight value.

In one embodiment, the average brightness of the frame of the image on present is a percentage value obtained by multiplying a signal number of each signal interval and an endpoint signal value of the signal interval in the statistical list, before dividing a sum of each product value by a sum of the number of the signals in all intervals, and further by a maximum signal value.

In one embodiment, the character point for the dark state detail is a signal interval point in an image when a ratio of a sum of multiplying a number of the signals in a certain signal interval by an endpoint signal value of the signal interval to a total number is closest to a preset value.

In one embodiment, the actual maximum brightness of the frame of the image on present is an absolute value brightness corresponding to a maximum interval signal in a plurality of intervals having a signal number among all signal intervals.

In one embodiment, a step of obtaining the first detail statistics weight value and the second detail statistics weight value, according to the analysis data comprises: obtaining a function curve according to the maximum display brightness of the monitor, the minimum display brightness of the monitor, the maximum signal amplitude of the content and the maximum display brightness of the full screen; mapping a function of the curve by a signal mapping function, and obtaining the signal control curve and the backlight control parameter according to a limit of the first detail statistics weight value and the second detail statistics weight value.

A dynamic image enhancement device using the backlight adjustment, wherein the device comprises:

a first acquiring module, applied to acquiring an encoding information that comes with a display content;

a second acquiring module, applied to acquiring an optical indicator parameter of a monitor;

a parsing module, applied to parsing the display content according to the encoding information and the optical indicator parameter, and obtaining an information of the display content on present;

an analysis module, applied to obtaining an analysis data according to analyzing and calculating the information of the display content; wherein the analysis data comprises an average brightness of a frame of an image on present, a character point for a dark state detail, an actual maximum brightness of the frame of the image on present, a theoretical maximum brightness of the frame of the image on present and a best brightness of the frame of the image on present;

a detail statistics weight value acquiring module, applied to acquiring a first detail statistics weight value and a second detail statistics weight value, according to the analysis data.

a calculation module, applied to calculating and obtaining a backlight control parameter and a signal control curve according to the first detail statistics weight value and the second detail statistics weight value;

an adjustment module, applied to adjusting a detail of the frame of the image on present according to the backlight control parameter and the signal control curve.

A computer apparatus, comprising a storage and a processor, the storage has a computer program stored, the processor executes the computer program to realize a plurality of following steps:

acquiring an encoding information that comes with a display content;

acquiring an optical indicator parameter of a monitor;

parsing the display content according to the encoding information and the optical indicator parameter, and obtaining an information of the display content on present;

obtaining an analysis data according to analyzing and calculating the information of the display content; wherein the analysis data comprises an average brightness of a frame of an image on present, a character point for a dark state detail, an actual maximum brightness of the frame of the image on present, a theoretical maximum brightness of the frame of the image on present and a best brightness of the frame of the image on present;

obtaining a first detail statistics weight value and a second detail statistics weight value, according to the analysis data;

calculating and obtaining a backlight control parameter and a signal control curve according to the first detail statistics weight value and the second detail statistics weight value;

adjusting a detail of the frame of the image on present according to the backlight control parameter and the signal control curve.

A computer readable storage medium, wherein having a computer program stored, a plurality of following steps are realized when the computer program is executed by the processor:

acquiring an encoding information that comes with a display content;

acquiring an optical indicator parameter of a monitor;

parsing the display content according to the encoding information and the optical indicator parameter, and obtaining an information of the display content on present;

obtaining an analysis data according to analyzing and calculating the information of the display content; wherein the analysis data comprises an average brightness of a frame of an image on present, a character point for a dark state detail, an actual maximum brightness of the frame of the image on present, a theoretical maximum brightness of the frame of the image on present and a best brightness of the frame of the image on present;

obtaining a first detail statistics weight value and a second detail statistics weight value, according to the analysis data;

calculating and obtaining a backlight control parameter and a signal control curve according to the first detail statistics weight value and the second detail statistics weight value;

adjusting a detail of the frame of the image on present according to the backlight control parameter and the signal control curve.

The dynamic image enhancement method and device using the backlight adjustment, and a computer apparatus stated above, through analyzing the display content and the optical parameter of the monitor, further adjusts the backlight according to an analysis data, being able not to sacrifice any image details when adjusting a backlight and on a basis of not increasing any hard hardware cost, instead, may enhance the image details to a certain extent, having a better image layering, and a deeper third-dimensional sense, making a detail of a displayed image clearer.

DETAILED DESCRIPTION OF EMBODIMENTS

In order to make the purpose, technical solution and the advantages of the present disclosure clearer and more explicit, further detailed descriptions of the present disclosure are stated here, referencing to the attached drawings and some embodiments of the present disclosure. It should be understood that the detailed embodiments of the disclosure described here are used to explain the present disclosure only, instead of limiting the present disclosure.

The dynamic image enhancement method using the backlight adjustment provided in the present disclosure, may be applied to a terminal, wherein the terminal may be, but not limited to, a plurality of personal computers, notebook computers, mobile phones, tablet computers, onboard computers, and portable wearable devices.

Embodiment 1

Shown as FIG. 1, a dynamic image enhancement method using a backlight adjustment is provided, and the method applied to a terminal is taken as an example for an explanation, wherein comprising a plurality of steps below.

Step 102, acquiring an encoding information that comes with a display content.

Wherein, the display content is a specific content of a source signal input to a monitor. After a series of encoding and decoding processing, a system software of the monitor may acquire the encoding information that comes with an input signal. Wherein the encoding information comprises an MDMA (MasterDisplayMaxLuminance, maximum display brightness of the screen), an MDMI (Master Display Min Luminance, minimum display brightness of the screen), and a CLL (Content Light Lv, maximum signal amplitude of the content).

Step 104, acquiring an optical indicator parameter of a monitor.

The optical indicator parameter comprises a maximum display brightness of a full screen and a maximum display brightness of a plurality of small backlight windows. In the present embodiment, the maximum display brightness of the small backlight windows comprises a maximum display brightness of a first small backlight window, a maximum display brightness of a second small backlight window, and a maximum display brightness of a third small backlight window. In the present embodiment, the maximum display brightness of the first small backlight window, the maximum display brightness of the second small backlight window, and the maximum display brightness of the third small backlight window are denoted as TDP_L10, TDP_L20, and TDP_L50, respectively.

Step 106, parsing the display content according to the encoding information and the optical indicator parameter, and obtaining an information of the display content on present.

In one embodiment, the present step comprises specifically: inputting the encoding information into a first query module, to obtain a maximum query brightness of the monitor; inputting the optical indicator parameter into a second query module, to obtain a maximum display brightness parameter curve of the small backlight window; performing a photoelectric conversion according to the maximum query brightness of the monitor and the maximum display brightness of the small backlight window, and making a statistical analysis of the frame of the image on present to obtain a statistical list.

Wherein the first query module has a three-dimensional table preset in, denoted as 3D_LUT_1, the three-dimension comprises a row, a column, a layer, each number obtained by rounding the MDMA, MDMI, CLL after being compressed by 100 times is corresponding to the three-dimension respectively. In the present embodiment, wherein the three-dimensional table is a table having 10 rows, 10 columns, and 10 layers. Assuming the MDMA=3, the MDMI=1, the CLL=2, then MDM_LUT=3D_LUT_1 (3, 1, 2). The three-dimensional table is obtained by a plurality of tests. Specifically, the terminal inputs the encoding information into the first query module to obtain the maximum query brightness of the monitor. Wherein the maximum query brightness of the monitor ranges from 0 to 1023.

Figure 2:
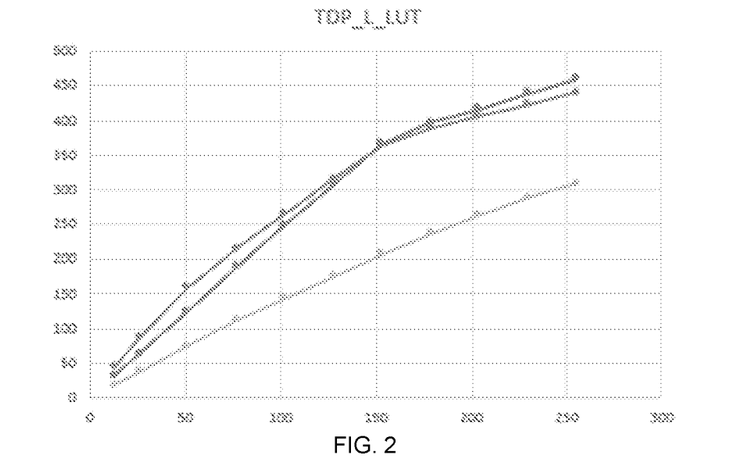
FIG. 2 illustrates a schematic diagram of multiple TDP_L_LUT in the present disclosure.

The second query module has a three-dimensional table preset in, denoted as 3D_LUT_2, the three-dimension means the row, the column, and the layer. In the present embodiment, there are 11 rows, 11 columns, and 11 layers, and a suffix i is added as 3D_LUT_2_i for a distinction. According to an input parameter, it is possible to find a specific parameter curve TDP_L_LUT. A specific query method is: normalizing TDP_L10/TDP_L20/TDP_L50 (divided by TDP), before multiplying 11 respectively, and a final value obtained will correspond to three dimensions of 3D_LUT_2_i. Each query gives a specific value ai (a1/a2/a3 . . . a11) (with a value range of 0-1023). After 11 times' query, 11 values will be obtained. Based on the 11 values, after a linear interpolation, the parameter curve TDP_L_LUT: f1 (13, 26, 51, 77, 102, 128, 153, 179, 204, 230, 255, a1, a2 . . . a11) will be obtained. FIG. 2 illustrates a schematic diagram of multiple TDP_L_LUT. The parameter TDP obtained according to the step 2 is taken as an output value of a function value, an input value thereof is looked for in a reverse way, and a final lookup value TDP_LUT is obtained, that is, TDP=TDP_L_LUT (TDP_LUT).

According to the MDM_LUT and the TDP_LUT obtained and mentioned above, through a photoelectric conversion function and a linear interpolation, a signal mapping function fa2 is obtained, then the display content is first subjected to a photoelectric conversion, then subjected to a mapping and parsing through the signal mapping function fa2 (that is, an original input signal amplitude is A, and becomes YA after the photoelectric conversion, and mapped to m times of YA through a curve of fa2. A value range of m is 0-5, and a maximum value is finally normalized to 255), followed by making a statistical analysis on each pixel value of the frame of the image, before getting a linear domain statistical list L_HIST. Shown as FIG. 3, it is an embodiment of a statistical list, the present list has a total of 32 values, and an abscissa is the signal interval, an ordinate is a plurality of statistical values corresponding to the interval.

Figure 3:
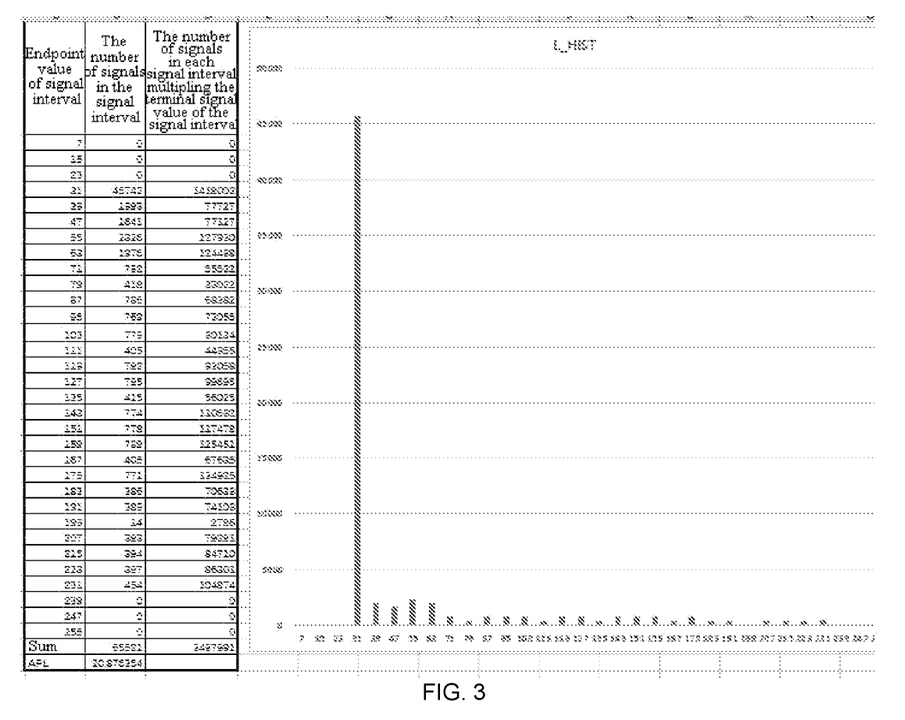
FIG. 3 illustrates a schematic diagram of the statistical list in the present disclosure.

Specifically, both MDM_LUT and TDP_LUT, after being converted by the photoelectric conversion function (an existing public function), two absolute value brightness of Y_MDM_LUT and Y_TDP_LUT are obtained. Taking two points of (0,0) and (Y_MDM_LUT, Y_TDP_LUT) as two endpoints, and making a linear interpolation, fa2(in)= Y_TDP_LUT/Y_MDM_LUT*in.

Step 108, obtaining an analysis data according to analyzing and calculating the information of the display content; wherein the analysis data comprises an average brightness of a frame of an image on present, a character point for a dark state detail, an actual maximum brightness of the frame of the image on present, a theoretical maximum brightness of the frame of the image on present and a best brightness of the frame of the image on present.

According to the statistical list L_HIST and the two lookup values of MDM_LUT and TDP_LUT acquired in the step 106, after analysis and calculation, an analysis data below is obtained: an average brightness APL of a frame of an image on present, a character point K for the dark state detail, an actual maximum brightness A1 of the frame of the image on present, a theoretical maximum brightness A2 of the frame of the image on present, and a best brightness A3 of the frame of the image on present. A specific process is as follows:

The average brightness APL of the frame of the image on present refers to, in the linear domain statistical list L_HIST above, a signal number of each signal interval multiplying an endpoint signal value of the signal interval (shown as a third column in FIG. 3), a sum of each product value dividing a sum of the signals in all intervals, and further dividing a maximum signal value, before obtaining a percentage value of a ratio. Take L_HIST in FIG. 3 as an example, APL=(7*0+15*0+23*0+31*45742+ . . . +255*0)/ 65521/255*100=20.876354.

The character point K for the dark state detail refers to, in a picture, when a ratio of a sum of the signal number of a certain signal interval multiplying an endpoint signal value of the signal interval to a total is closest to a certain level (such as 8%, which is determined by an actual situation), such an interval point is called the character point K for the dark state detail.

The actual maximum brightness A1 of the frame of the image on present, refers to, in the L_HIST mentioned above, an absolute value brightness A1 (a value range of A1 is 0 to 10000) corresponding to a maximum interval signal in a plurality of intervals having a signal number among all signal intervals. Taking L_HIST in FIG. 3 as an example, the maximum interval signal is 231, this value is used as the input parameter, after being calculated by a built-in conversion function f1, a corresponding absolute value brightness A1=f1(231)=OETF(231) will be obtained, wherein the OETF stands for an existing public photoelectric conversion function.

The theoretical maximum brightness A2 of the frame of the image on present points to, the A1 and the TDP_LUT stated above, after being calculated by an inner conversion function f2, obtaining A2=f2(A1,TDP_LUT)=OETF(TDP_LUT)/10000*A1.

The best brightness A3 of the frame of the image on present points to, the A1, the MDM_LUT, and the TDP_LUT, after being calculated by an inner conversion function f3, obtaining A2=f3(A1,MDM_LUT,TDP_LUT)=OETF(TDP_LUT)/OETF(MDM_LUT)*A1.

Step 110, obtaining a first detail statistics weight value and a second detail statistics weight value, according to the analysis data.

Specifically, Inputting the analysis parameters of APL, K and A1 in the step 108 into a third query module, the module has a series of three-dimensional data (a three-dimensional table with 10 rows, 10 columns, and 10 layers) preset, after being looked up (the APL/K/A1 needs to be compressed in a plurality of different proportions before corresponding to three dimensions of the row, the column and the layer. Herein, the APL is compressed in 10 times before being rounded, K is compressed in 2.5 times before being rounded, A1 is compressed in 1000 times before being rounded), a detail statistics weight value P1. is obtained.

Inputting the analysis parameters of A1, A2 and A3 in the step 108 into a fourth query module, the module has a series of three-dimensional data (a three-dimensional table with 10 rows, 10 columns, and 10 layers) preset, after being looked up (the A1/A2/A3 needs to be compressed in a same proportion before corresponding to the three dimensions of the row, the column and the layer. Herein, they are compressed in 1000 times before being rounded), a detail statistics weight value P2. is obtained.

Step 112, calculating and obtaining a backlight control parameter and a signal control curve according to the first detail statistics weight value and the second detail statistics weight value.

The parameters of MDMA, MDMCLLDPa2( ), P1 and P2 obtained in the steps above, after a series of operations including derivation and interpolation fitting calculation, a core algorithm module will output a detail processing list DL1. Wherein the interpolation fitting calculation comprises a cubic interpolation, a Gaussian filtering and a Bessel fitting.

According to the MDMA, the DMI, the CLL and the TDP, a function curve f4 is obtained (MDMA, MDMI, CLL, TDP, IN), wherein IN is corresponding to a signal code value, having a value range of 0-255. A specific process is as below:

making a data process to the MDMA, MDMI, CLL, TDP, and obtaining a coordinate of three points: PB1(MDMI/MDMA,0.001), PB2(TDP/MDMA,0.8), PB3(CLL/MDMA, 0.99);

taking PB1, PB2, and PB3 as three control points of a Bezier curve and substitute into a formula of the Bezier curve. The formula is as follows: $B(t)=PB0*(1-t)^3+3*PB1*t*(1-t)^2+3*PB2*t^2*(1-t)+PB3*t^3, t\in[0,1]$, wherein the coordinate of PB0 is (0,0), and an interval of t is 0.01, then 100 points will be obtained;

connecting the 100 points above, a piecewise linear function f4 is obtained;

mapping a curve of the piecewise linear function f4 above by the signal mapping function fa2, and adding the weight value P1/P2 at a same time, before obtaining a new function curve f5(IN)=P1/(P1+P2)*f4(IN)+P2, that is the detail processing list DL1 at last, i.e. a signal control curve M1.

Figure 4:
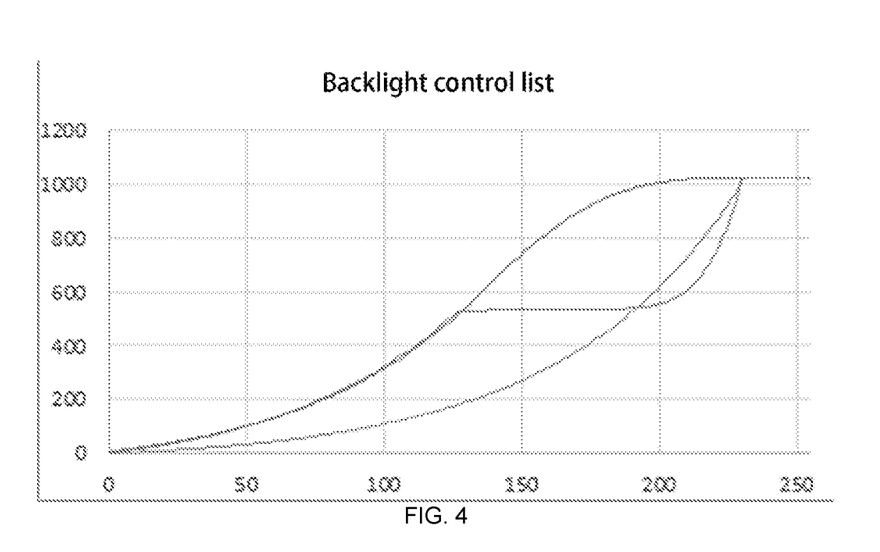
FIG. 4 illustrates a schematic diagram on an accumulated value of a list on a plurality of groups of backlight control in the present disclosure.

According to the parameters of TDP_LUT, TDP_L_LUT, P1 and P2, the core algorithm module will output a backlight control list BLL1 (the list has 10 elements: BLL1_1, BLL1_2 . . . BLL1_10. A specific calculation process is as follows). FIG. 4 illustrates a schematic diagram on an accumulated value of a list on a plurality of groups of backlight control.

Specifically, according to the TDP_LUT and the P1/P2, it is possible to obtain a backlight control value BLL1_0=TDP_LUT*P1/P2+a, a is a configuration value, which is 0 as a default, and if the BLL1_10 is greater than 1000, then BLL1_10=1000.

According to the TDP_L_LUT and a backlight value BL_N on present and a target backlight value BLL1_10, 9 backlight variation step value step_i will be obtained. A detailed calculation is as an embodiment below:

Substituting the BL_N into the TDP_L_LUT, and B1=TDP_L_LUT(BL_N) is obtained;

Substituting the BLL1_10 into the TDP_L_LUT, and B2=TDP_L_LUT(BLL1_10) is obtained;

B3=B1+(B2-B1)/10, deducing B3_N from B3=TDP_L_LUT(B3_N);

step_1=B3_N-B1;

wherein BLL1_10 is a $10^{th}$ element in the backlight control list, and 9 others are deduced according to a step length. BLL1_9=BLL1_10-Step_9, BLL1_8=BLL1_9-step_8, and so on.

Step 114, adjusting a detail of the frame of the image on present according to the backlight control parameter and the signal control curve.

For each frame of the image, a backlight adjustment list BLL1 and a signal control curve M1 will be generated correspondingly. Under a combined action of both, a detail of the frame of the image on present is enhanced to an appropriate degree, making a better image layering, and a deeper third-dimensional sense. Most importantly, a detail enhancement of the present algorithm is a dynamic enhancement combining a detail distribution of each frame of the image, an image change of a previous frame and a next frame, and a scene recognition.

In the present embodiment, the terminal analyzes the display content and the optical parameters of the monitor, and further adjusts the backlight according to an analysis data, being able not to sacrifice any image details when adjusting the backlight and on a basis of not increasing any hard hardware cost, instead, may enhance the image details to a certain extent, having a better image layering, and a deeper third-dimensional sense, making a detail of a displayed image clearer.

Figure 1:
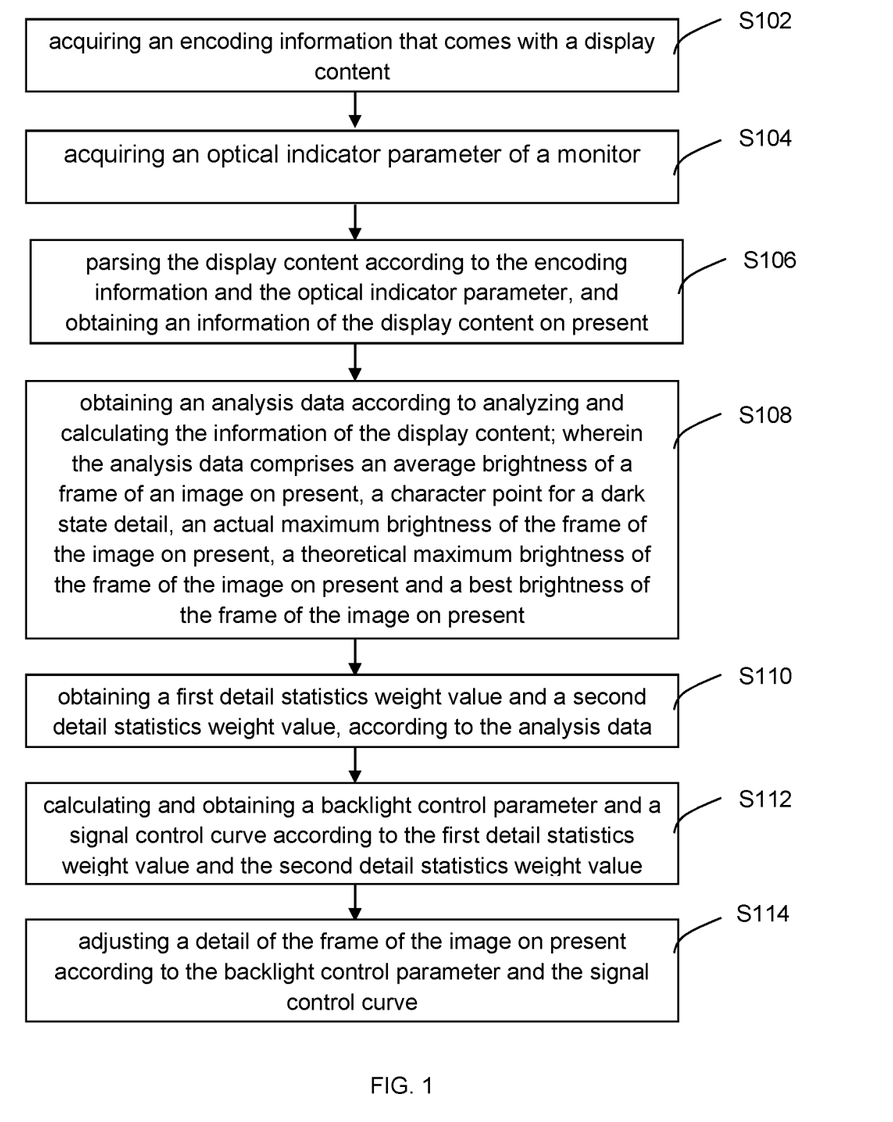
FIG. 1 illustrates a flowchart on a dynamic image enhancement method using a backlight adjustment in an embodiment in the present disclosure.

It should be understood that, although each step in the flowchart of FIG. 1 is displayed sequentially as indicated by a plurality of arrows, the steps are not necessarily executed orderly in a sequence indicated by the arrows. Unless it is specifically stated in the present description, an execution of the steps is not strictly limited in an order, instead, the steps can be executed in a plurality of other orders. Furthermore, at least a part of the steps in FIG. 2 may comprise a plurality of sub-steps or a plurality of stages. The sub-steps or stages are not necessarily executed at a same time, instead, being able to be executed at a plurality of different moments. An execution order of the sub-steps or stages is also not necessarily performed sequentially, instead, it is possible to be performed alternately or in a turn with at least a part of the other steps or a sub-step or a stage of the other steps.

Embodiment 2

Figure 5:
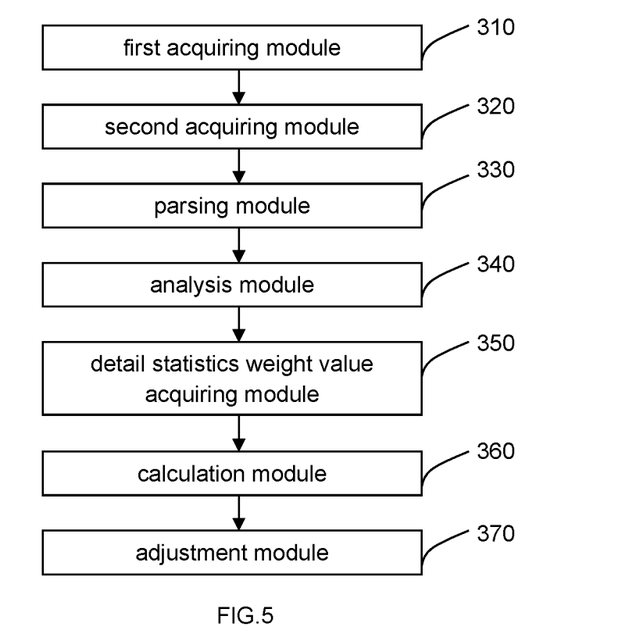
FIG. 5 illustrates a structural block diagram on a dynamic image enhancement device using a backlight adjustment in an embodiment of the present disclosure.

Shown as FIG. 5, the present disclosure provides a dynamic image enhancement device using a backlight adjustment, comprises: a first acquiring module 510, a second acquiring module 520, a parsing module 530, an analysis module 540, a detail statistics weight value acquiring module 550, a calculation module 560, an adjustment module 570, wherein:

the first acquiring module 510, applied to acquiring an encoding information that comes with a display content;

the second acquiring module 520, applied to acquiring an optical indicator parameter of a monitor;

the parsing module 530, applied to parsing the display content according to the encoding information and the optical indicator parameter, and obtaining an information of the display content on present;

the analysis module 540, applied to obtaining an analysis data according to analyzing and calculating the information of the display content; wherein the analysis data comprises an average brightness of a frame of an image on present, a character point for a dark state detail, an actual maximum brightness of the frame of the image on present, a theoretical maximum brightness of the frame of the image on present and a best brightness of the frame of the image on present;

the detail statistics weight value acquiring module 550, applied to obtaining a first detail statistics weight value and a second detail statistics weight value, according to the analysis data.

the calculation module 560, applied to calculating and obtaining a backlight control parameter and a signal control curve according to the first detail statistics weight value and the second detail statistics weight value;

the adjustment module 570, applied to adjusting a detail of the frame of the image on present according to the backlight control parameter and the signal control curve.

In an embodiment, the first acquiring module is specifically applied for: the system software of the monitor encodes and decodes the display content input to obtain the encoding information that comes with the display content; wherein the encoding information comprising the maximum display brightness of the monitor, the minimum display brightness of the monitor and the maximum signal amplitude of a content.

In one embodiment, the optical indicator parameter comprises a maximum display brightness of a full screen and a maximum display brightness of a plurality of small backlight windows.

In one embodiment, the dynamic image enhancement device using the backlight adjustment further comprises a correction module, applied to using an image processing algorithm to perform a graphic correction on a documented picture.

In one embodiment, the parsing module is specifically applied to inputting the encoding information into the first query module to obtain the maximum query brightness of the monitor; inputting the optical indicator parameter into the second query module to obtain the maximum display brightness parameter curve of the small backlight window; performing the photoelectric conversion according to the maximum query brightness of the monitor and the maximum display brightness of the small backlight window, and making the statistical analysis of the frame of the image on present to obtain the statistical list.

In one embodiment, the analysis module is further applied to performing the statistical analysis of the display content, and obtaining the signal mapping function.

In one embodiment, the detail statistics weight value acquiring module is further applied to inputting the analysis data comprising the average brightness of the frame of the image on present, the character point for the dark state detail, the actual maximum brightness of the frame of the image on present into the third query module, and obtaining the first detail statistics weight value; inputting the theoretical maximum brightness of the frame of the image on present and the best brightness of the frame of the image on present into the fourth query module, and obtaining the second detail statistics weight value.

In one embodiment, the adjustment module is further applied to obtaining a function curve according to the maximum display brightness of the monitor, the minimum display brightness of the monitor, the maximum signal amplitude of the content and the maximum display brightness of the full screen; mapping a function of the curve by a signal mapping function, and obtaining the signal control curve and the backlight control parameter according to a limitation of the first detail statistics weight value and the second detail statistics weight value.

A specific limitation of the dynamic image enhancement device using the backlight adjustment may refer to a plurality of limitations of the dynamic image enhancement method using the backlight adjustment, and no more details will be repeated herein. Each module in the dynamic image enhancement device using the backlight adjustment stated above may be implemented in a whole or in a part by software, hardware, and a combination thereof. Each module stated above may be embedded in a form of hardware or independent to a processor in a computer equipment, or may be stored in a form of software in a memory of the computer equipment, to facilitate the processor to call and execute a plurality of operations corresponding to the modules stated above.

Embodiment 3

Figure 6:
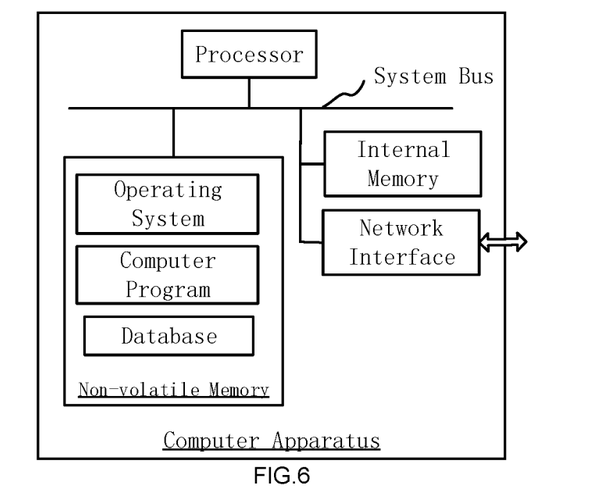
FIG. 6 illustrates an inner structural diagram on a computer apparatus in one embodiment of the present disclosure.

The present disclosure provides a computer apparatus, the computer apparatus may be a camera device, having an inner structure shown as FIG. 6. The computer apparatus comprises a processor, a memory, a network interface, a screen and an input device which are connected by a system bus. Wherein the processor of the computer apparatus is applied to providing an ability of calculation and controlling. The memory of the computer apparatus comprises a non-volatile storage medium and an internal memory. The non-volatile storage medium has an operating system and a computer program stored. The internal memory provides an environment for an operation of the operating system and computer programs in the non-volatile storage medium. The network interface of the computer apparatus is applied to communicating with an external camera device or a server through a network connection. When the computer program is executed by the processor, the dynamic image enhancement method using the backlight adjustment is realized. the screen of the computer apparatus may be a liquid crystal display screen or an electronic ink display screen, and an input device of the computer apparatus may be a touch layer covered on the screen, may also be a button, a trackball or a touchpad set on a shell of the computer apparatus, may also be an external keyboard, an external touchpad, or an external mouse.

Those skilled in the art can understand that, the structure shown in FIG. 6 is only a block diagram of a part of the structures related to the solution of the present disclosure, without constituting a limitation to a computer device to which the solution of the present disclosure is applied, a specific computer device may comprise more or fewer parts than shown in the figures, or a combination of some parts, or have a different arrangement of the parts.

Embodiment 4

The present disclosure provides a computer apparatus, comprising: a storage and a processor, the storage has a computer program stored, the processor executes the computer program to realize a plurality of following steps:

acquiring an encoding information that comes with a display content;

acquiring an optical indicator parameter of a monitor;

parsing the display content according to the encoding information and the optical indicator parameter, and obtaining an information of the display content on present;

obtaining an analysis data according to analyzing and calculating the information of the display content; wherein the analysis data comprises an average brightness of a frame of an image on present, a character point for a dark state detail, an actual maximum brightness of the frame of the image on present, a theoretical maximum brightness of the frame of the image on present and a best brightness of the frame of the image on present;

obtaining a first detail statistics weight value and a second detail statistics weight value, according to the analysis data;

calculating and obtaining a backlight control parameter and a signal control curve according to the first detail statistics weight value and the second detail statistics weight value;

adjusting a detail of the frame of the image on present according to the backlight control parameter and the signal control curve.

In an embodiment, a step of acquiring the encoding information that comes with the display content comprises specifically: a system software of the monitor encodes and decodes the display content input to obtain the encoding information that comes with the display content; wherein the encoding information comprising a maximum display brightness of a monitor, a minimum display brightness of the monitor, and a maximum signal amplitude of a content.

In one embodiment, the optical indicator parameter comprises a maximum display brightness of a full screen and a maximum display brightness of a plurality of small backlight windows.

In one embodiment, a step of parsing the display content according to the encoding information and the optical indicator parameter, and obtaining the information of the display content on present, comprises: inputting the encoding information into the first query module to obtain the maximum query brightness of the monitor; inputting the optical indicator parameter into the second query module to obtain the maximum display brightness parameter curve of the small backlight window; performing the photoelectric conversion according to the maximum query brightness of the monitor and the maximum display brightness of the small backlight window, and making the statistical analysis of the frame of the image on present to obtain the statistical list.

In one embodiment, a step of obtaining the analysis data according to analyzing and calculating the information of the display content further comprises: performing a statistical analysis on the display content and obtaining a signal mapping function.

In one embodiment, a step of obtaining the first detail statistics weight value and the second detail statistics weight value, according to the analysis data comprises: inputting the analysis data comprising the average brightness of the frame of the image on present, the character point for the dark state detail, the actual maximum brightness of the frame of the image on present into the third query module, and obtaining the first detail statistics weight value; inputting the theoretical maximum brightness of the frame of the image on present and the best brightness of the frame of the image on present into a fourth query module, and obtaining the second detail statistics weight value.

In one embodiment, a step of calculating and obtaining the backlight control parameter according to the first detail statistics weight value and the second detail statistics weight value, comprising: obtaining a function curve according to the maximum display brightness of the monitor, the minimum display brightness of the monitor, the maximum signal amplitude of the content and the maximum display brightness of the full screen; mapping a curve function by a signal mapping function, and obtaining the signal control curve and the backlight control parameter according to a limitation of the first detail statistics weight value and the second detail statistics weight value.

Embodiment 5

The present disclosure provides a computer readable storage medium, wherein having a computer program stored, a plurality of following steps are realized when the computer program is executed by the processor:

acquiring an encoding information that comes with a display content;

acquiring an optical indicator parameter of a monitor;

parsing the display content according to the encoding information and the optical indicator parameter, and obtaining an information of the display content on present;

obtaining an analysis data according to analyzing and calculating the information of the display content; wherein the analysis data comprises an average brightness of a frame of an image on present, a character point for a dark state detail, an actual maximum brightness of the frame of the image on present, a theoretical maximum brightness of the frame of the image on present and a best brightness of the frame of the image on present;

obtaining a first detail statistics weight value and a second detail statistics weight value, according to the analysis data;

calculating and obtaining a backlight control parameter and a signal control curve according to the first detail statistics weight value and the second detail statistics weight value;

adjusting a detail of the frame of the image on present according to the backlight control parameter and the signal control curve.

In one embodiment, a step of acquiring the encoding information that comes with the display content comprises specifically: a system software of the monitor encodes and decodes the display content input to obtain the encoding information that comes with the display content, wherein the encoding information comprises a maximum display brightness of the monitor, a minimum display brightness of the monitor, and a maximum signal amplitude of the content.

In one embodiment, the optical indicator parameter comprises a maximum display brightness of the full screen and a maximum display brightness of a plurality of small backlight windows.

In one embodiment, a step of parsing the display content according to the encoding information and the optical indicator parameter, and obtaining the information of the display content on present, comprises: inputting the encoding information into a first query module to obtain a maximum query brightness of the monitor; inputting the optical indicator parameter into a second query module to obtain a maximum display brightness parameter curve of the small backlight window; performing a photoelectric conversion according to the maximum query brightness of the monitor and the maximum display brightness of the small backlight window, and making a statistical analysis of the frame of the image on present to obtain a statistical list.

In one embodiment, a step of obtaining the analysis data according to analyzing and calculating the information of the display content further comprises: performing a statistical analysis on the display content and obtaining a signal mapping function.

In one embodiment, a step of obtaining the first detail statistics weight value and the second detail statistics weight value, according to the analysis data comprises: inputting the analysis data comprising the average brightness of the frame of the image on present, the character point for the dark state detail, the actual maximum brightness of the frame of the image on present into a third query module, and obtaining the first detail statistics weight value; inputting the theoretical maximum brightness of the frame of the image on present and the best brightness of the frame of the image on present into a fourth query module, and obtaining the second detail statistics weight value. In one embodiment, a step of calculating and obtaining the backlight control parameter according to the first detail statistics weight value and the second detail statistics weight value, comprising: obtaining a function curve according to the maximum display brightness of the monitor, the minimum display brightness of the monitor, the maximum signal amplitude of the content and the maximum display brightness of the full screen; mapping a function of the curve by a signal mapping function, and obtaining the signal control curve and the backlight control parameter according to a limitation of the first detail statistics weight value and the second detail statistics weight value.

In one embodiment, a step of calculating and obtaining the backlight control parameter according to the first detail statistics weight value and the second detail statistics weight value, comprising: obtaining a function curve according to the maximum display brightness of the monitor, the minimum display brightness of the monitor, the maximum signal amplitude of the content and the maximum display brightness of the full screen; mapping a function of the curve by a signal mapping function, and obtaining the signal control curve and the backlight control parameter according to a limitation of the first detail statistics weight value and the second detail statistics weight value.

An ordinary technical personnel skilled in the art may understand that all or part of the processes in the embodiments on the methods described above may be implemented by instructing a plurality of relevant hardware through a computer program. The computer program may be stored in a non-volatile computer readable storage medium, when the computer program is executed, it may comprise a plurality of procedures of the embodiments on each of the method described above. Wherein, any references to the memory, the storage, a database or a plurality of other media used in the embodiments provided in the present disclosure may comprise a non-volatile and/or volatile memory. The non-volatile memory may comprise a read only memory (ROM), a programmable ROM (PROM), an electrically programmable ROM (EPROM), an electrically erasable programmable ROM (EEPROM), or a flash memory. The volatile memory may comprise a random access memory (RAM) or an external high speed cache memory. As an illustration but a limitation, RAM is available in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchronization link (Synchlink) DRAM (SLDRAM), a memory bus (Rambus) direct RAM (RDRAM), direct rambus dynamic RAM (DRDRAM), and rambus dynamic RAM (RDRAM), and more.

A plurality of technical features of the embodiments described above may be combined arbitrarily. In order to make the description concise, all possible combinations of the technical features in the embodiments described above are not described. However, as long as there is no contradiction in a combination of the technical features, they should be considered as a range described in the description.

It should be understood that, the application of the present disclosure is not limited to the above examples listed. Ordinary technical personnel in this field can improve or change the applications according to the above descriptions, all of these improvements and transforms should belong to the scope of protection in the appended claims of the present disclosure.

What is claimed is:

1. A dynamic image enhancement method using a backlight adjustment, wherein the method comprises:
   acquiring an encoding information that comes with a display content;
   acquiring an optical indicator parameter of a monitor;
   parsing the display content according to the encoding information and the optical indicator parameter, and obtaining an information of the display content;
   obtaining an analysis data by analyzing and calculating the information of the display content; wherein the analysis data comprises an average brightness of a frame of an image, a character point for a dark state detail, an actual maximum brightness of the frame of the image, a theoretical maximum brightness of the frame of the image and a best brightness of the frame of the image;
   obtaining a first detail statistics weight value and a second detail statistics weight value, according to the analysis data;
   calculating and obtaining a backlight control parameter and a signal control curve according to the first detail statistics weight value and the second detail statistics weight value;

adjusting a detail of the frame of the image according to the backlight control parameter and the signal control curve;

wherein:

the optical indicator parameter comprises a maximum display brightness of a full screen and a maximum display brightness of a plurality of small backlight windows;

the character point for the dark state detail is a signal interval point in an image when a ratio of a sum of multiplying a number of the signals in a certain signal interval by an endpoint signal value of the signal interval to a total number is closest to a preset value;

the parsing the display content according to the encoding information and the optical indicator parameter, and obtaining the information of the display content, comprises:

based on the encoding information, obtaining a maximum query brightness of the monitor;

based on the optical indicator parameter, obtaining a maximum display brightness parameter curve of the small backlight window; and performing a photoelectric conversion according to the maximum query brightness of the monitor and the maximum display brightness of the small backlight window, and making a statistical analysis of the frame of the image to obtain a statistical list;

the obtaining the first detail statistics weight value and the second detail statistics weight value, according to the analysis data comprises:

based on the analysis data comprising the average brightness of the frame of the image, the character point for the dark state detail, the actual maximum brightness of the frame of the image, obtaining the first detail statistics weight value; and based on the theoretical maximum brightness of the frame of the image and the best brightness of the frame of the image, obtaining the second detail statistics weight value;

the calculating and obtaining the backlight control parameter and the signal control curve according to the first detail statistics weight value and the second detail statistics weight value comprises:

obtaining a function curve according to the maximum display brightness of the monitor, the minimum display brightness of the monitor, the maximum signal amplitude of the display content and the maximum display brightness of the full screen; and mapping a function of the curve by a signal mapping function, and obtaining the signal control curve and the backlight control parameter according to a limit of the first detail statistics weight value and the second detail statistics weight value.

2. The method according to claim 1, wherein a step of acquiring the encoding information that comes with the display content comprises specifically: a system software of the monitor encodes and decodes the display content input to obtain the encoding information that comes with the display content.

3. The method according to claim 2, wherein the encoding information comprises a maximum display brightness of a monitor, a minimum display brightness of the monitor, and a maximum signal amplitude of a content.

4. The method according to claim 1, wherein the maximum query brightness of the monitor ranges from 0 to 1023.

5. The method according to claim 1, wherein a step of obtaining the analysis data by analyzing and calculating the information of the display content further comprises: performing a statistical analysis on the display content and obtaining a signal mapping function.

6. The method according to claim 1, wherein the average brightness of the frame of the image is a percentage value obtained by multiplying a signal number of each signal interval and an endpoint signal value of the signal interval in the statistical list, before dividing a sum of each product value by a sum of the signals in all intervals, and further by a maximum signal value.

7. The method according to claim 1, wherein the actual maximum brightness of the frame of the image is an absolute value brightness corresponding to a maximum interval signal in a plurality of intervals having a signal number among all signal intervals.

8. A non-transitory computer readable storage medium, having a computer program stored, wherein when the computer program is executed by the processor, the computer program cause the processor to perform:

acquiring an encoding information that comes with a display content;

acquiring an optical indicator parameter of a monitor;

parsing the display content according to the encoding information and the optical indicator parameter, and obtaining an information of the display content;

obtaining an analysis data by analyzing and calculating the information of the display content wherein the analysis data comprises an average brightness of a frame of an image, a character point for a dark state detail, an actual maximum brightness of the frame of the image, a theoretical maximum brightness of the frame of the image and a best brightness of the frame of the image;

obtaining a first detail statistics weight value and a second detail statistics weight value, according to the analysis data;

calculating and obtaining a backlight control parameter and a signal control curve according to the first detail statistics weight value and the second detail statistics weight value;

adjusting a detail of the frame of the image according to the backlight control parameter and the signal control curve;

wherein:

the optical indicator parameter comprises a maximum display brightness of a full screen and a maximum display brightness of a plurality of small backlight windows;

the character point for the dark state detail is a signal interval point in an image when a ratio of a sum of multiplying a number of the signals in a certain signal interval by an endpoint signal value of the signal interval to a total number is closest to a preset value;

the parsing the display content according to the encoding information and the optical indicator parameter, and obtaining the information of the display content, comprises:

based on the encoding information, obtaining a maximum query brightness of the monitor;

based on the optical indicator parameter, obtaining a maximum display brightness parameter curve of the small backlight window; and performing a photoelectric conversion according to the maximum query brightness of the monitor and the maximum display brightness of the small backlight window, and making a statistical analysis of the frame of the image to obtain a statistical list;

the obtaining the first detail statistics weight value and the second detail statistics weight value, according to the analysis data comprises:

based on the analysis data comprising the average brightness of the frame of the image, the character point for the dark state detail, the actual maximum brightness of the frame of the image, obtaining the first detail statistics weight value; and based on the theoretical maximum brightness of the frame of the image and the best brightness of the frame of the image, obtaining the second detail statistics weight value;

the calculating and obtaining the backlight control parameter and the signal control curve according to the first detail statistics weight value and the second detail statistics weight value comprises:

obtaining a function curve according to the maximum display brightness of the monitor, the minimum display brightness of the monitor, the maximum signal amplitude of the display content and the maximum display brightness of the full screen; and mapping a function of the curve by a signal mapping function, and obtaining the signal control curve and the backlight control parameter according to a limit of the first detail statistics weight value and the second detail statistics weight value.

\* \* \* \* \*